United States Patent [19]
Osakabe et al.

[11] Patent Number: 5,666,363
[45] Date of Patent: Sep. 9, 1997

[54] METHOD FOR TRANSMISSION, METHOD FOR RECEPTION, METHOD FOR COMMUNICATION AND BIDIRECTIONAL BUS SYSTEM

[75] Inventors: Yoshio Osakabe; Hiroshi Yamazaki, both of Kanagawa; Yasuo Kusagaya, Tokyo; Noriko Kotabe, Chiba; Koji Iwamoto; Yoko Souma, both of Nara; Toshihiro Imaura; Shigeru Maki, both of Osaka, all of Japan

[73] Assignees: Sony Corporation, Tokyo; Matsushita Electric Industrial Co., Osaka, both of Japan

[21] Appl. No.: 329,251

[22] Filed: Oct. 26, 1994

[30] Foreign Application Priority Data

Oct. 30, 1993 [JP] Japan ..................... 5-294182

[51] Int. Cl.$^6$ .................................. H04L 12/40
[52] U.S. Cl. .............. 370/426; 340/825.07; 340/825.52; 348/8; 348/461
[58] Field of Search ............... 370/85.3, 17, 43, 370/67, 85.1, 85.2, 84.5, 85.15, 105.1, 110.1, 60, 85.11, 85.13, 92, 94.1, 99; 340/825.07, 825.52, 825.53; 348/7, 6, 8, 722, 461, 474, 705, 706; 395/200; 364/900; 455/3.1, 5.1

[56] References Cited

U.S. PATENT DOCUMENTS

| | | | |
|---|---|---|---|
| 4,872,162 | 10/1989 | Tamaka et al. | 370/85.12 |
| 5,007,013 | 4/1991 | Elms | 364/900 |
| 5,130,793 | 7/1992 | Bordry et al. | 455/5.1 X |
| 5,251,208 | 10/1993 | Canniff et al. | 370/77 |
| 5,276,684 | 1/1994 | Pearson | 370/94.1 |
| 5,313,408 | 5/1994 | Goto | 395/200 X |
| 5,357,511 | 10/1994 | DiNapoli et al. | 370/85.11 |

*Primary Examiner*—Benedict V. Safourek
*Assistant Examiner*—Ricky Q. Ngo
*Attorney, Agent, or Firm*—Jay H. Maioli

[57] ABSTRACT

A method for signal transmission and reception by a bidirectional bus system in which plural devices performing the communication of a command and a request are interconnected over a bidirectional bus includes the steps of providing a frame of a transmission signal on the bidirectional bus the frame including an address field for designating addresses of communicating devices and a data field for designating the command or request to be transmitted, and inserting the discrimination information for discriminating between the command and the request at a pre-set position in the data field. The transmission signal including the discrimination information is transmitted over the bidirectional bus to other devices. A communication system employing such a bidirectional bus system is also provided.

10 Claims, 11 Drawing Sheets

| CODE | b3 | b2 | b1 | b0 | MESSAGE DIRECTION | FUNCTION | LOCK STATE |
|---|---|---|---|---|---|---|---|
| "0"h | 0 | 0 | 0 | 0 | FROM SLAVE TO MASTER | READ-IN SLAVE STATE | NON-LOCK |
| "1"h | 0 | 0 | 0 | 1 | | UNDEFINED (FOR FUTURE EXTENSION) | |
| "2"h | 0 | 0 | 1 | 0 | | READ-IN SLAVE STATE | LOCK |
| "3"h | 0 | 0 | 1 | 1 | | DATA READ-IN | LOCK |
| "4"h | 0 | 1 | 0 | 0 | | READ-IN LOCK ADDRESS (LOWER 8 BITS) | NON-LOCK |
| "5"h | 0 | 1 | 0 | 1 | | READ-IN LOCK ADDRESS (LOWER 4 BITS) | NON-LOCK |
| "6"h | 0 | 1 | 1 | 0 | | READ-IN SLAVE STATE | UNLOCK |
| "7"h | 0 | 1 | 1 | 1 | | DATA READ-IN | UNLOCK |
| "8"h | 1 | 0 | 0 | 0 | FROM MASTER TO SLAVE | MEMORY ADDRESS WRITE | LOCK |
| "9"h | 1 | 0 | 0 | 1 | | UNDEFINED (FOR FUTURE EXTENSION) | |
| "A"h | 1 | 0 | 1 | 0 | | COMMAND WRITE | LOCK |
| "B"h | 1 | 0 | 1 | 1 | | DATA WRITE | LOCK |
| "C"h | 1 | 1 | 0 | 0 | | UNDEFINED (FOR FUTURE EXTENSION) | |
| "D"h | 1 | 1 | 0 | 1 | | UNDEFINED (FOR FUTURE EXTENSION) | |
| "E"h | 1 | 1 | 1 | 0 | | COMMAND WRITE | UNLOCK |
| "F"h | 1 | 1 | 1 | 1 | | DATA WRITE | UNLOCK |

FIG.3
(PRIOR ART)

| Bit number | Meaning | |
|---|---|---|
| 7 | Always 0 | |
| 6 | Reserved for future standardization, "1" | |
| 5, 4 | Source service code | 00 : CT |
| | | 01 : AV/C |
| | | 10 : HK |
| | | 11 : reserved |
| 3, 2 | Destination service code | 00 : CT |
| | | 01 : AV/C |
| | | 10 : HK |
| | | 11 : reserved |
| 1 | 1/0 without/with SSDA | |
| 0 | 1/0 without/with DSDA | |

**FIG.4
(PRIOR ART)**

| MSB | | | | | | | LSB |
|---|---|---|---|---|---|---|---|
| b7 | b6 | b5 | b4 | b3 | b2 | b1 | b0 |
| 0 | COMMAND, REQUEST ANSWER AND AUTOMATIC STATUS TRANSMISSION  b6 b5 b4 :  000 : COMMAND  001 : STATUS REQUEST  010 : DATA REQUEST  011 : ANSWER  100 : AUTOMATIC STATUS TRANSMISSION  101 :  110 :   ⎤ UNDEFINED  111 :  ⎦ | | | SERVICE CODE  b3b2 :  00 : COMMUNICATION TELEPHONY  01 : AV  10 : HOUSEKEEPING  11 : ADDITIONAL AV | | SSDA/DSDA/DEVICE DESIGNATION  b1b0 :  00 : UNUSABLE  01 : SSDA  10 : DSDA  11 : DEVICE | |

FIG.10

METHOD FOR TRANSMISSION, METHOD FOR RECEPTION, METHOD FOR COMMUNICATION AND BIDIRECTIONAL BUS SYSTEM

BACKGROUND OF THE INVENTION

This invention relates to a method for transmission, a method for reception, a method for communication, and a bi-directional bus system. The present invention is applied to, for example, a system for controlling sub-devices, such as a monitor receiver, a TV tuner or a video deck enclosed in devices such as a television receiver or a video tape recorder, or transmitting the operating states of these devices over a bi-directional bus interconnecting these devices.

It has recently been common practice to interconnect plural audio equipment or visual equipment, referred to herein as AV equipment, over a video signal line or an audio signal line, referred to herein as an AV signal line, in order to form an AV system.

With such an AV system, one practice is to interconnect the equipment over a system control bus in addition to the above-mentioned AV signal bus, referred to herein as a bi-directional bus, in order to control the equipment with respect to each other and to transmit data indicating the operation statuses etc., of the equipment, also referred to herein simply as statuses. Illustrative examples of these systems include audio, video and audiovisual systems, domestic digital bus (D2B) as specified in IEC Publication 1030 issued in May 1991 and a home bus system (HBS) as disclosed in "Transistor Technology, special issue, No.30, chapter 7, published by CQ Publications on Nov. 1, 1991. Using a bi-directional bus, equipment or devices, such as a television receiver (TV), a video tape recorder (VTR) or a video deck player (VDP) control other equipment or sub-devices such as a monitor TV receiver, a TV tuner, a video deck or an amplifier enclosed in the devices. In addition, the statuses of the devices or sub-devices are transmitted over the bidirectional bus. With the D2B, for example, a carrier sense multiple access with collision detection (CSMA/CD) is adopted as the bidirectional accessing system.

Thus communication from a sub-device enclosed in a device to a sub-device enclosed in another device, communication from a sub-device enclosed in a device to another device, communication from a device to a sub-device enclosed in another device and communication from a device to another device, are executed over the bidirectional bus.

The format for transmission signals employed in the above-mentioned bidirectional bus, such as D2B, is now explained. With the D2B, commands or statuses for controlling the sub-devices etc., of the destination of transmission, referred to herein as a control command, is of a frame structure, and is transmitted over the bidirectional bus, as shown in FIG. 1.

That is, each frame is made up of a header field 101 designating a header indicating the leading end of the frame, a master address field 102 designating an address of an originating device (source device), a slave address field 103 designating an address of a device of the destination of transmission, that is a destination or receiving device, a control field 104 for designating a control bit indicating weather communication is under a locked or unlocked state of the device of the destination of transmission, and a data field 105 for designating the control command or status.

The header of the header field is made up of a start bit 101a composed of a bit for synchronization and a mode bit 101b for specifying the rate of transmission and the number of bytes of the data field 105. The mode bit 101b is made up of 1 to 3 bits and is used for specifying a mode 0 for providing the data field composed of 2 bytes at the maximum, a mode 1 for providing the data field composed of 32 bytes at the maximum (16 bytes each for the master and the slave if the data field extends from the slave to the master), and a mode 2 for providing the data field composed of 128 bytes at the maximum (64 bytes each for the master and the slave if the data field extends from the slave to the master), as shown in FIG. 2.

The address of the originating device of the master address field 102 is made up of a 12-bit master address for designating the address of the originating device and a 1-bit parity, as shown in FIG. 2.

The address of the originating device of the slave address field 103 is made up of a 12-bit master address for designating the address of the originating device, a 1-bit parity and a 1-bit acknowledge data for responding to the destination device, as shown in FIG. 2.

The control field 104 has 4-bit control data 104a for indicating the direction of transmission of the control command of the status or the locked or unlocked state, a 1-bit parity data and a 1-bit acknowledge data 104c, as shown in FIG. 2. Specifically, the control bits are employed for checking whether the status is being written from the master to the slave or from the slave to the master, whether the originating device communicates with the destination device under the locked state or under the unlocked state of the destination device, and whether the data is the data per se or control command, as shown in FIG. 9.

The data field 105 has an 8-bit data bit 105a, a 1-bit end-of-data bit 105b, a 1-bit parity 105c and 1-bit acknowledge bit 105d, these being repeated in this order, if so required, as shown in FIG. 2. If the data bit 105a is designated #1, #2, #3, . . . , from its leading end, and the command is being transmitted, an operation code or OPC "begin 2", indicating the sub-device-related communication, that is the code "BD"h, h indicating a hexadecimal code, an OPC "begin 1" indicating communication via HBS, and an OPC "begin 0" indicating communication over another bus, that is the code "BB", are designated in data #1, while operands OPRs for these OPCs are designated in data #2. For communicating the data, the data are sequentially designated in data #1, #2, #3, . . . , on the basis of an 8-bit byte.

The OPR for the above-defined OPC, for example, the OPR for the OPC "begin 2" is made up of bits $b_5$, $b_4$, $b_3$, $b_2$ for identifying the service codes for communication telephony (CT), audio video and control (AV/C) and housekeeping (HK), with the bit $b_7$ being an MSB, and bits $b_1$, $b_0$ for indicating one of the communication from a sub-device to a sub-device, communication from a sub-device to a device, communication from a device to a sub-device and the communication from a device to a device, that is, indicating the presence or absence of the address of the originating sub-device (source sub-device address or SSDA) and the destination sub-device address or DSDA), as shown in FIG. 4. The bit $b_7$ is perpetually 0 and the bit $b_6$ is reserved for future standardization and is currently set to 1. Specifically, $b_1=0$ and $b_0=0$ indicate communication from a sub-device to a sub-device, $b_1=0$ and $b_0=1$ indicate communication from a sub-device to a device, $b_1=1$ and $b_0=0$ indicate communication from a device to a sub-device, and $b_1=1$ and $b_0=1$ indicate the communication from a device to a device.

A sequence of operations comprising controlling a VTR by the TV transmitting a control command to a VTR, the TV transmitting a request demanding the status to the VTR and receiving the status from the VTR as an answer to the request for confirming the operating states (status) of the controlled VTR, is hereinafter explained.

Referring to FIG. 5, the TV formulates a command frame in which the master address bit is set to the TV address, the slave address bit is set to the VTR address, the control bit is set to "A"h indicating the code of writing the command under the locked state, data #1 is set to e.g., the code "BD"h (OPC "begin 2"), data #2 is set to the code "56"h indicating communication from the device to the sub-device, data #3 is set to the video deck address for the VTR as the route selection information, data #4 is set to a code "C3"h (command) for playing the video deck and data #5 is set to a code "75"h (OPR) indicating forward in data #4. The TV detects the presence or absence of the so-called carrier on the bidirectional bus and, if there is no carrier, that is if the bus is vacant, the TV transmits the command frame to the VTR and subsequently transiently halts the carrier transmission to open the bus. Thus the control command is transmitted from the TV to the VTR which then starts the reproducing operation. In order to prevent the VTR from being controlled by the sets command occasionally transmitted during this sequence of operations from another device to this VTR, the TV controls the VTR to its locked state by the aforementioned control bit in order for the VTR not to accept the control command from such another device.

The TV then formulates a request frame in which the master address bit is set to the TV address, the slave address bit is set to the VTR address, the control bit is set to "A"h indicating the code of writing the command under the locked state, the data #1 is set to a request code, data #2 is set to the OPR for the request code and the data #3 is set to a terminator, as shown in FIG. 5B. When the bidirectional bus becomes vacant again, the TV transmits the request frame. Meanwhile, the code of the control command of the data #4 shown in FIG. 5A should inherently be different from the request code of the data #1 shown in FIG. 5B. However, since there is imposed a limitation in the kinds of the code that may be represented by eight bits, the same code is employed for the control command code and for the request code, and the control command code is distinguished from the request frame by addition of the aforementioned terminator.

The TV also formulates an answer frame in which the master address bit is set to the TV address, the slave address bit is set to VTR address, the control bit is set to the code "2"h indicating the data readout under the locked state, that is the status readout of video deck, as shown in FIG. 5C, and transmits the answer frame to the VTR. The VTR sets (designates) an answer code, an OPR for the answer code and the terminator in data #1, #2 and #3, respectively, and returns the frame designated in this manner. With the answer frame, in distinction from the above-mentioned command and request frame, the status transmission from the slave to the master occurs in the data frame 105.

The TV then formulates an end command frame in which the master address bit is set to the TV address, the slave address bit is the VTR address, the control bit is set to the code "E"h indicating the command writing under the non-locked state, and an end command is set in data #1, and transmits the end command frame to the VTR. The VTR is unlocked by the end command frame and enabled to receive control commands etc., of other device(s).

With the above-described conventional bidirectional bus system, it is necessary for the TV to transmit a command frame for transmitting a control command to the VTR and subsequently transmit a request frame for confirming the status of the VTR. Besides, since the route selection information composed of OPC "begin 2" is present only in the command frame, the TV needs to transmit an answer frame. In addition, the TV has to transmit an end command frame in order to release the locked state of the VTR. That is, with the conventional bidirectional bus system, the TV needs to transmit the command frame, request frame, answer frame and the end command as a set, with the consequence that the traffic is increased while lowering the transmission efficiency is and having a communication procedure (protocol) that is complex.

In addition, the time consumed when the VTR receives the control command and is again readied for reproduction until it returns the answer to the request is longer as compared to the rate of communication because of the mechanical operation of the video deck. Since the bidirectional bus is occupied during such time, it becomes necessary for other device(s) to wait for a prolonged time until the bidirectional bus becomes cleared.

Furthermore, since the terminator is affixed to the trailing end of the request frame for discrimination between the control command code and the request code, the destination or receiving device, such as the VTR, becomes complex in the processing hardware. Besides, should the terminator be absent by dropout, the request frame tends to be mistaken for the command frame.

OBJECT AND SUMMARY OF THE INVENTION

In view of the above-described status of the prior art, it is an object of the present invention to provide a method for transmission, a method for reception, a method for communication, and a bi-directional bus system whereby the amount of traffic on the bidirectional bus may be lesser than in the conventional communication method and whereby the transmission efficiency may be improved and the communication protocol may be simplified.

In one aspect, the present invention provides a method for transmission by a bidirectional bus system in which plural devices performing the communication of a command and a request are interconnected over a bidirectional bus. The transmission method includes the steps of providing a frame of a transmission signal on the bidirectional bus from an address field for designating addresses of communicating devices and a data field for designating the command or request to be transmitted, and inserting the discriminating information for discrimination between the command and the request at a pre-set position in the data field. The transmission signals having the discrimination information inserted therein is transmitted over the bidirectional bus to other devices.

In another aspect, the present invention provides a method for reception of a bidirectional bus system in which plural devices performing the communication of a command and a request are interconnected over a bidirectional bus. The method for reception includes the steps of receiving a transmission signal over the bidirectional bus, and detecting the discrimination information from the transmission signal. The transmission signal has a frame structure comprised of an address field for designating addresses of communicating devices and a data field for designating the command or request to be transmitted. The transmission signal has the discrimination information inserted at a pre-set position in the data field. The discrimination information for discriminating between the command and the request. The recognition of whether the contents of the data field is the command or the request is made on the basis of the discrimination information.

In still another aspect, the present invention provides a communication system employing a bidirectional bus system in which plural devices performing the communication of a command and a request are interconnected over a bidirectional bus. A source device provides a frame of a transmission signal on the bidirectional bus by an address field for designating addresses of communicating devices and a data field for designating the command or the request to be transmitted, inserts the discrimination information at a pre-set position of the data field for discriminating the command and the request from each other, and sends out the transmission signal with the discrimination information inserted therein over the bidirectional bus. A destination device receives the transmission signal over the bidirectional bus, detects the discrimination information from the transmission signal and recognizes whether the contents of the data field is the command or the request based upon the discrimination information.

In yet another aspect, the present invention provides a bidirectional bus system comprising a plurality of devices performing the communication of a command or a request. These devices include transmission signal forming means for providing a frame by an address field for designating addresses of communicating devices and a data field for designating the command or the request to be transmitted and inserting the discrimination information at a pre-set position of the data field for discriminating the command and the request from each other to form a transmission signal. The devices also include bus outputting means for outputting transmission signals formed by the transmission forming means over the bidirectional bus, bus inputting means for receiving transmission signals over the bidirectional bus, and control means for detecting the discrimination information from the transmission signals received by the bus inputting means and recognizing whether the contents of the data field is the command or the request based upon the discrimination information. The devices are interconnected over the bidirectional bus.

In sum, a source device provides a frame of a transmission signal on the bidirectional bus from an address field for designating addresses between communicating devices and a data field for designating a command or a request to be transmitted, and sends out the transmission signal over the bidirectional bus after insertion of the discrimination information at a pre-set position in a data field for discriminating the command and the request from each other. A destination device receives the transmission signal over the bidirectional bus and detects the discrimination information from the transmission signal. The destination device recognizes whether the contents of the data field are the command or the request based on the discrimination information. Thus the hardware and the processing software of the source device (originating device) may be simplified as compared to a conventional system. Since the discriminating information is inserted at other than the trailing end of the frame, the possibility of dropout of the discrimination information is low, thus rendering it possible to prevent the request frame from being mistaken for the command frame.

The source device also designates the command, the request, the answer to the request or the device status in the data field, and sends out the transmission signal after inserting the discrimination signal discriminating the command, the request, the answer to the request and the automatic status transmission from one another in the transmission signal. The destination device discriminates the contents of the data field as being the command, the request, the answer or the automatically transmitted status based upon the discrimination signal. Thus it is possible for the devices to optionally send out the command frame, the request frame, the answer frame or the automatic status transmission frame irrespective of other frames, thereby reducing the traffic on the bidirectional bus and improving the transmission efficiency. On the other hand, the communication protocol may also simplified. In addition, since the frames may be sent out optionally, the bidirectional bus may be prevented from being occupied for a long time period relative to the rate of communication to reduce the traffic on the bus in contradistinction from the conventional bidirectional bus system in which the bus is occupied for lengthy time intervals until the answer to the request is returned.

BRIEF DESCRIPTION OF THE DRAWINGS

FIG. 3 shows the function of a conventional control bit.

FIG. 4 shows the function of the OPR of a conventional OPC "begin 2".

FIG. 10 shows a practical format of a HDOPR.

DETAILED DESCRIPTION OF PREFERRED EMBODIMENTS

Figure 1:
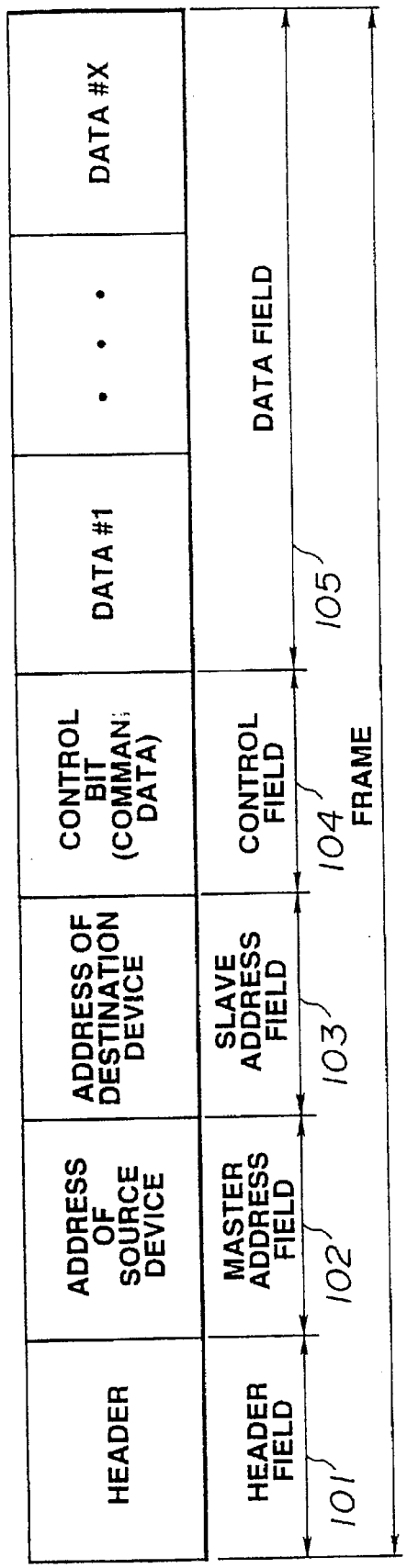
FIGS. 1 and 2 show a format for a conventional D2B frame.

By referring to the drawings, a method for transmission, a method for reception, a method for communication, and a bi-directional bus system according to the present invention will be explained in detail. In the present embodiment, the present invention is applied to an audio, video and visual systems domestic digital bus system (D2B system) prescribed in the so-called IEC publication 1030 and to a home bus system (HBS) prescribed in EIJA ET-2101.

Figure 6:
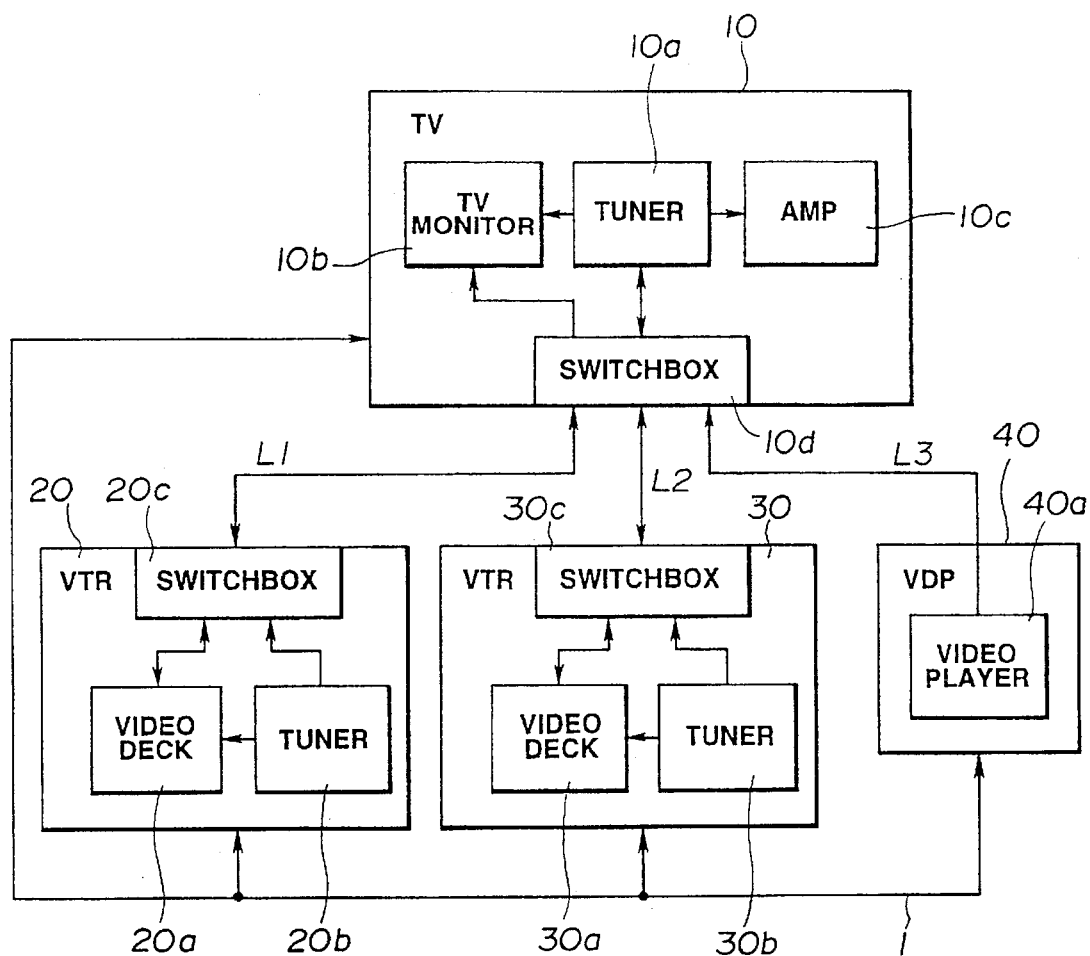
FIG. 6 is a block diagram showing a practical arrangement of a bidirectional bus system according to the present invention.

The bidirectional bus system according to the present invention comprises a television receiver (TV) 10 as a device, video tape recorders (VTRs) 20, 30 as devices and a video deck player (VDP) 40, interconnected over a bidirectional bus 1, as shown for example in FIG. 6.

The TV 10 encloses, as sub-devices, a tuner 10a for receiving television broadcasting signals for reproducing video and audio signals, a TV monitor 10b for displaying a picture based upon video signals reproduced by the tuner 10a, while also enclosing, as a sub-device, a switch box 10d for outputting the video signals and/or the audio signals (AV signals) from the tuner 10a to outside or for supplying the input AV signals from outside to the tuner 10a and to the TV monitor 10b, as shown in FIG. 6.

The VTR 20 encloses, as sub-devices, a video deck 20a for recording or reproducing AV signals on or from a magnetic tape, a tuner 20b for receiving television broadcasting signals for reproducing the AV signals, and a switch box 20c for outputting the AV signals from the video deck 20a and the tuner 20b to outside or for supplying input AV signals from outside to the video deck 20a, as shown in FIG. 6.

Similar to the VTR 20, the VTR 30 also encloses, as sub-devices, a video deck 30a, a tuner 30b and a switch box 30c.

The VDP 40 encloses, as a sub-device, a video player 40a for reproducing an AV signals from the optical disc.

The bidirectional bus system transmits video signals reproduced by the VTR 20, VTR 30 and the VDP 40 to the TV 10, and the picture based on the video signals is displayed on the TV monitor 10b. Specifically, the switch box 10d of the TV 10 and the switch box 20c of the TV VTR 20 are interconnected over an AV signal line L1, and the switch box 10d of the TV 10 and the switch box 20c of the VTR 30 are interconnected over an AV signal line L2, while the switch box 10d of the TV 10 and the video player 40a are interconnected over an AV signal line L3. The AV signal lines L1, L2 and L3 are interconnected around the TV 10, and AV signals reproduced by the VTRs 20 and 30 and the video deck player VDP 40 are fed via the AV signal lines L1, L2 and L3 and the switch box 10d to the TV monitor 10b for displaying the picture on the TV monitor 10b. On the other hand, the AV signals reproduced by the video player 40a are supplied to the video deck 20a via the AV signal line L3, switch box 10d, AV signal line L1 and the switch box 20c so as to be recorded on a magnetic tape, not shown.

Besides, with the present bidirectional bus system, the TV 10 (device) transmits control commands over the bidirectional bus 1 to the VTRs 20, 30 and the video deck player 40 as devices and the video decks 20a, 30a, video player 40a and the switch boxes 20c, 30c enclosed therein, as sub-devices, for controlling these devices and sub-devices. The controlled devices and sub-devices, such as the VTR 20, respond thereto by returning the data indicating their operating states.

With the bidirectional bus system, the TV 10 transmits the requests for the statuses to the VTR 20 over the bidirectional bus 1, for example, data to be displayed on the TV monitor 10b, and the VTR 20 etc., responds thereto by transmitting back the statuses. In addition, with the present bidirectional bus system, the VTR 20, for example, automatically returns the statuses to the TV 10 in the absence of such requests.

Figure 7:
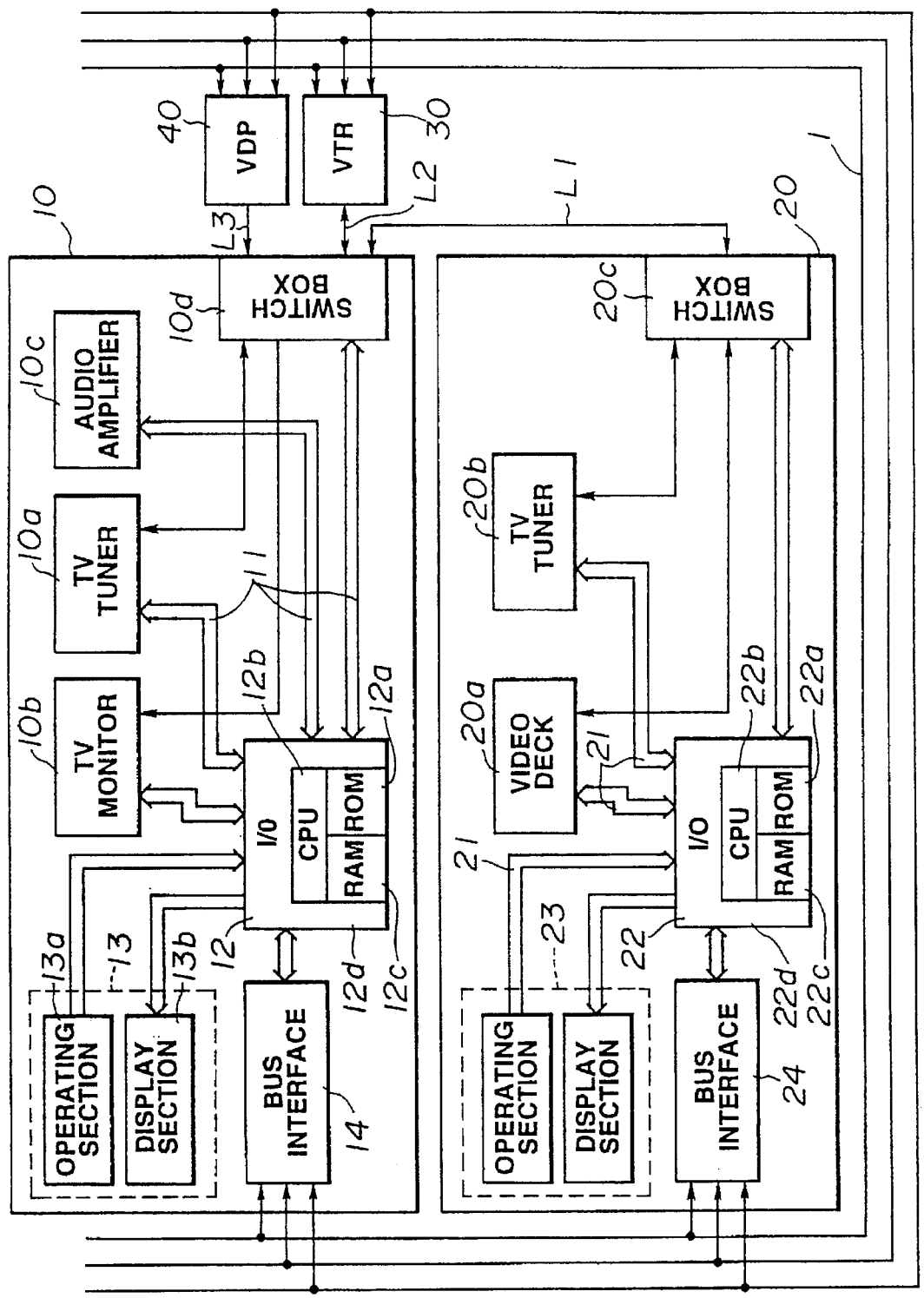
FIG. 7 is a block diagram showing practical arrangements of the TV and the VTR of the bidirectional bus system shown in FIG. 8.

Specifically, the TV 10 comprises a micro-processor 12 for controlling the tuner 10a to the switchbox 10d via an inner control bus 11, a user interfacing unit 13 for inputting the user's operational contents to the micro-processor 12, and a bus interfacing circuit 14 for inputting and outputting transmission signals to and from the bidirectional bus 1, as shown in FIG. 7. The transmission signals include control commands for controlling other devices or sub-devices and the statuses.

The VTR 20 also includes a micro-processor 22 for controlling the video deck 20a to the switchbox 20c over an internal control bus 21, a user interfacing unit 23 for inputting the user's operational contents to the microprocessor 22 and a bus interfacing circuit 24 for inputting and outputting the transmission signals to and from the bidirectional bus 1, as also shown in FIG. 7. The VTR 30 and the VDP 40 also include a micro-processor and a bus interfacing circuit, not shown.

If the user actuates the user interfacing unit 13 in order to view a picture corresponding to the video signals reproduced by the VTR 20 on the TV 10, the micro-processor 12 generates transmission signals responsive to the operational contents, and transmits the generated transmission signals to the VTR 20. The micro-processor 20 of the VTR 20 causes the video deck 20a to reproduce the picture over the internal control bus 21, based upon the transmission signals received by the bus interfacing circuit 24, while causing the AV signals reproduced by the video deck 20a to be supplied to the switch box 20c.

The user interfacing circuit 13 is made up of an actuating section 13a having a key switch or the like and a display section 13b having light-emitting diodes, as shown in FIG. 7. The actuating section 13a routes a signal corresponding to the operational contents entered by the user with a key switch to the micro-processor 12 over the internal control bus 11.

The micro-processor 12 includes a read-only memory 12a for storing various programs, a central processing unit (CPU) 12b for executing the programs stored in the ROM 12a, a random access memory (RAM) 12c for storing the results of execution, and an I/O circuit 12d for interfacing with the tuner 10a and the bus interfacing circuit 14, as shown in FIG. 7. The programs stored in the ROM 12a include command tables for converting the received control commands into internal control commands for controlling the tuner 10a and the switchbox 10d, programs for displaying the picture corresponding to the received data on the TV monitor 10b.

The CPU 12b executes the program stored in the ROM 12a for producing control commands for controlling the VTR 20 based upon the signals corresponding to the operational contents supplied thereto from the actuating section 13a via the internal control bus 11 and the I/O circuit 12d, and transmits the control command as a frame construction to the bus interfacing circuit 14.

The CPU 12b also routes statuses etc. as a frame structure to the bus interfacing circuit 14, while causing letters etc., corresponding to data received via the bus interfacing circuit 14 such as the status of the VTR 20, to be displayed on the TV monitor 10b.

The bus interfacing circuit 14 employs, as an accessing system to the bidirectional bus 1, a so-called carrier sense multiple access with collision detection (CSMA/CD), and is connected to the bidirectional bus 1 via a connector as prescribed by, for example, the so-called IEC/SC 48B (secretariat) 202.

Figure 8A:
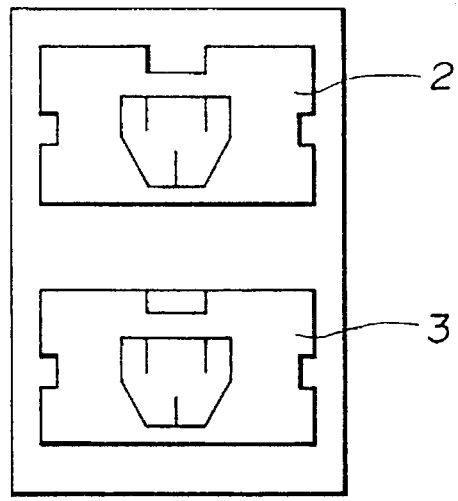
FIGS. 8A and 8B show the construction of a bidirectional bus connector of the bidirectional bus system shown in FIG. 7.
Figure 8B:
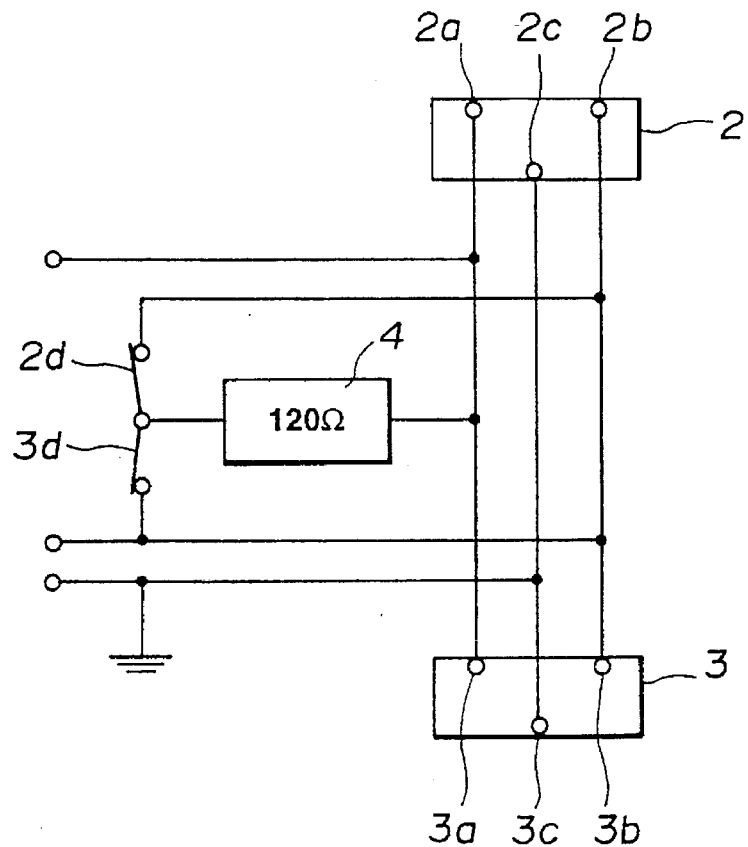

Specifically, the connector has two sockets 2, 3, as shown in FIG. 8A. The socket 2 has signal contacts 2a, 2b and a ground contact 3c connected internally to signal contacts 3a, 3b of the socket 3 and the ground contact 3c of the socket 3, as shown in FIG. 8B. The contacts 2a, 2b are interconnected via a switch 2d and a terminal resistor of e.g. 120 ohms, while the contacts 3a, 3b are interconnected via a switch 3d and the terminal resistor 4.

Such a connector is provided in respective devices, such as the TV 10. With the connector provided in the VTR 20, when the plug of the bidirectional bus 1 from the TV 10 and the plug of the bidirectional bus 1 from the VTR 30 are inserted into the sockets 2, 3, the switches 2d, 3d are opened for disconnecting the terminal resistor 4, so that transmission signals from the VTR 10 are routed to the bus interfacing circuit 24 and to the downstream side VTR 30 and VDP 40.

The format of transmission signals transmitted over the bidirectional bus 1 is now explained. The format of the transmission signals is substantially pursuant to the D2B format described in connection with the prior art. Thus the control command for controlling the destination sub-device and the statuses of the VTR 20 are transmitted in a frame structure as shown for example in FIG. 9.

That is, each frame is made up of a header field 51 for designating a header indicating the leading end of each frame, a master address field 52 for designating the address of an originating device, a slave address field 53 for designating a destination device, a control field 54 for designating a control bit indicating communication under a state of having locked or unlocked the destination device, and a data field 55 for designating a control command or statuses.

Figure 2:
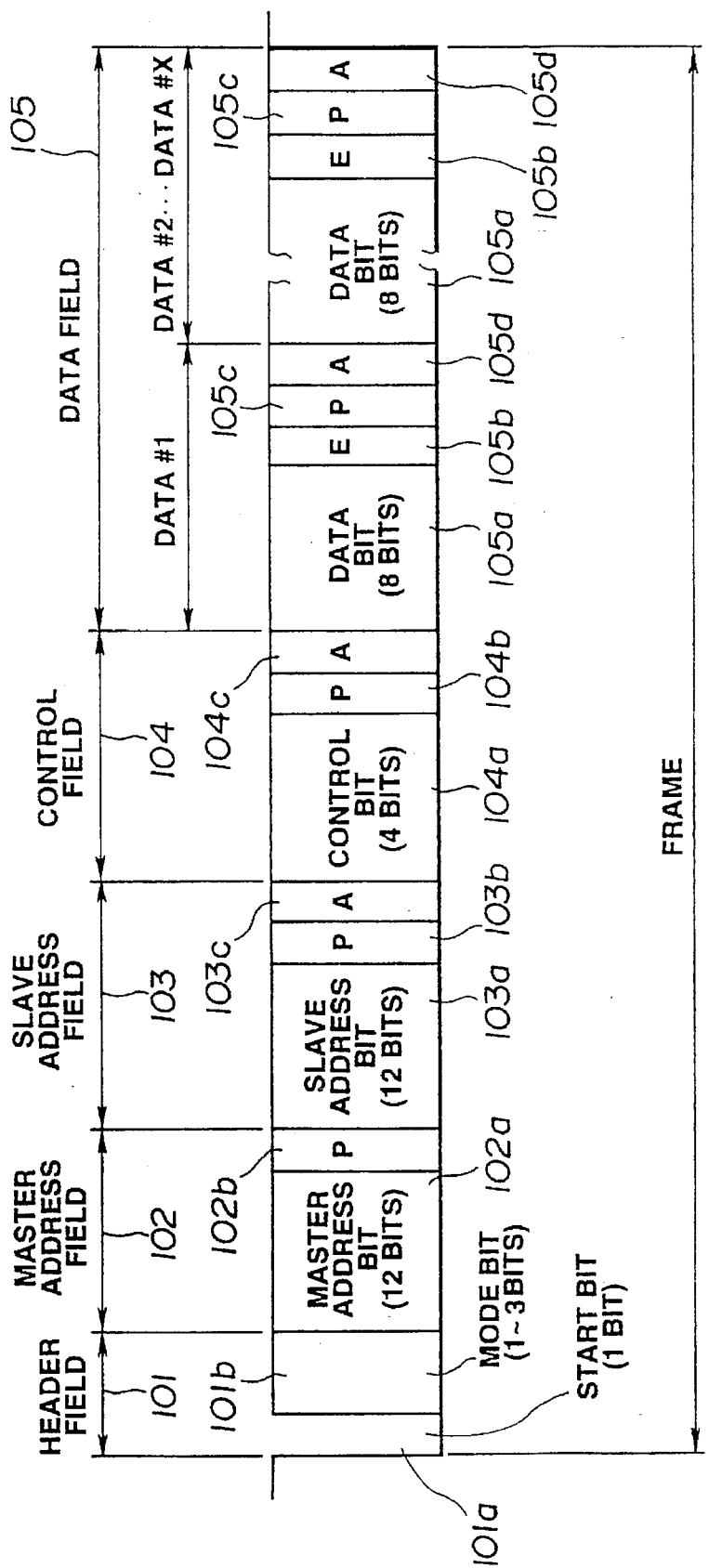

The header of the header field 51 is constructed in accordance with the D2B standard explained in connection with the prior art (see FIG. 2), and is made up of a start bit for synchronization and a mode bit for specifying the number of bytes of the data field 55.

The address of the originating device of the master address field 52 is constructed in accordance with the D2B standard as explained in connection with the prior art, and is made up of 12-bit master address bits for specifying the address of the originating device and a 1-bit parity.

The address of the destination device of the slave address field 53 is constructed in accordance with the D2B standard as explained in connection with the prior art, and is made up of 12-bit slave address bits for specifying the address of the originating device, a 1-bit parity and a 1-bit acknowledge bit for responding from the destination device.

In the control field 54, 4-bit control bits designating the locked or unlocked state and designating whether the contents of the data field 55 are the control command or the status (data), a 1-bit parity and a 1-bit acknowledge bit, in accordance with the D2B standard as explained in connection with the prior art, are designated. For the control bits only the master-to-slave codes prescribed in D2B and indicating the writing under the locked state of the command "E"h, $\underline{h}$ indicating the hexadecimal code, the code "B"h $\underline{h}$ indicating the hexadecimal code indicating the writing under the state of data lock, and the code "F"h, indicating only the writing under the data non-locked state, are employed.

In the data field 55, 8-bit data bits, a 1-bit end-of-data bit, a 1-bit parity and a 1-bit acknowledge bit, are repeated as the occasion may demand, substantially in accordance with the D2B standard as explained in connection with the prior art. If the data bits are data #1, #2, #3, . . . , from the leading end, the route selection codes for discrimination between the command frame, request frame and the response frame or the automatic status transmission frame, are designated in prescribed positions, such as data #1 to #3, as shown in FIG. 9.

Figure 9:
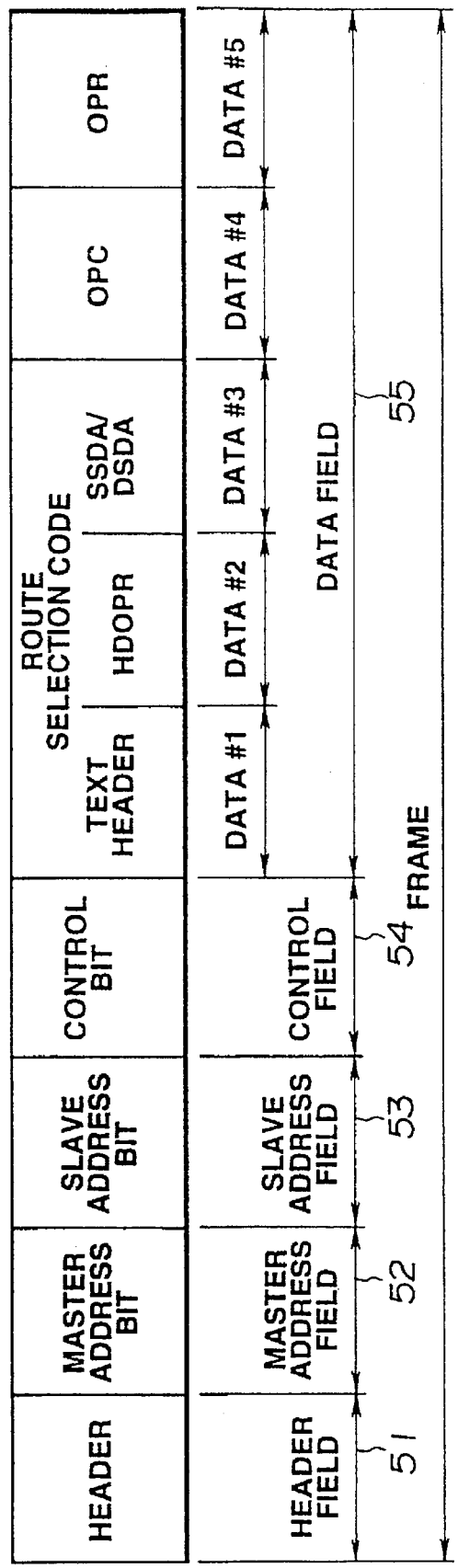
FIG. 9 shows the format of a frame of transmission signals.

The route selection code is made up of an 8-bit text header, an 8-bit header operand indicating whether the frame is the command frame, request frame, answer frame or the automatic status transmission frame, and also indicating communication from a sub-device enclosed in a device to another device, communication from a device enclosed in a device to a sub-device enclosed in another device or communication from a device to another device, and an 8-bit sub-device address indicating the address of the originating sub-device (source sub-device address or SSDA) or the address of the destination sub-device or the destination sub-device address or DSDA), as shown in FIG. 9. The text header is designated in the data #1 as the code "AB"h for distinction from the OPC "begin 2" (code "BD"h), OPC "begin 1" or OPC "begin 0" ("BB"h) employed in the conventional D2b.

Figure 5:
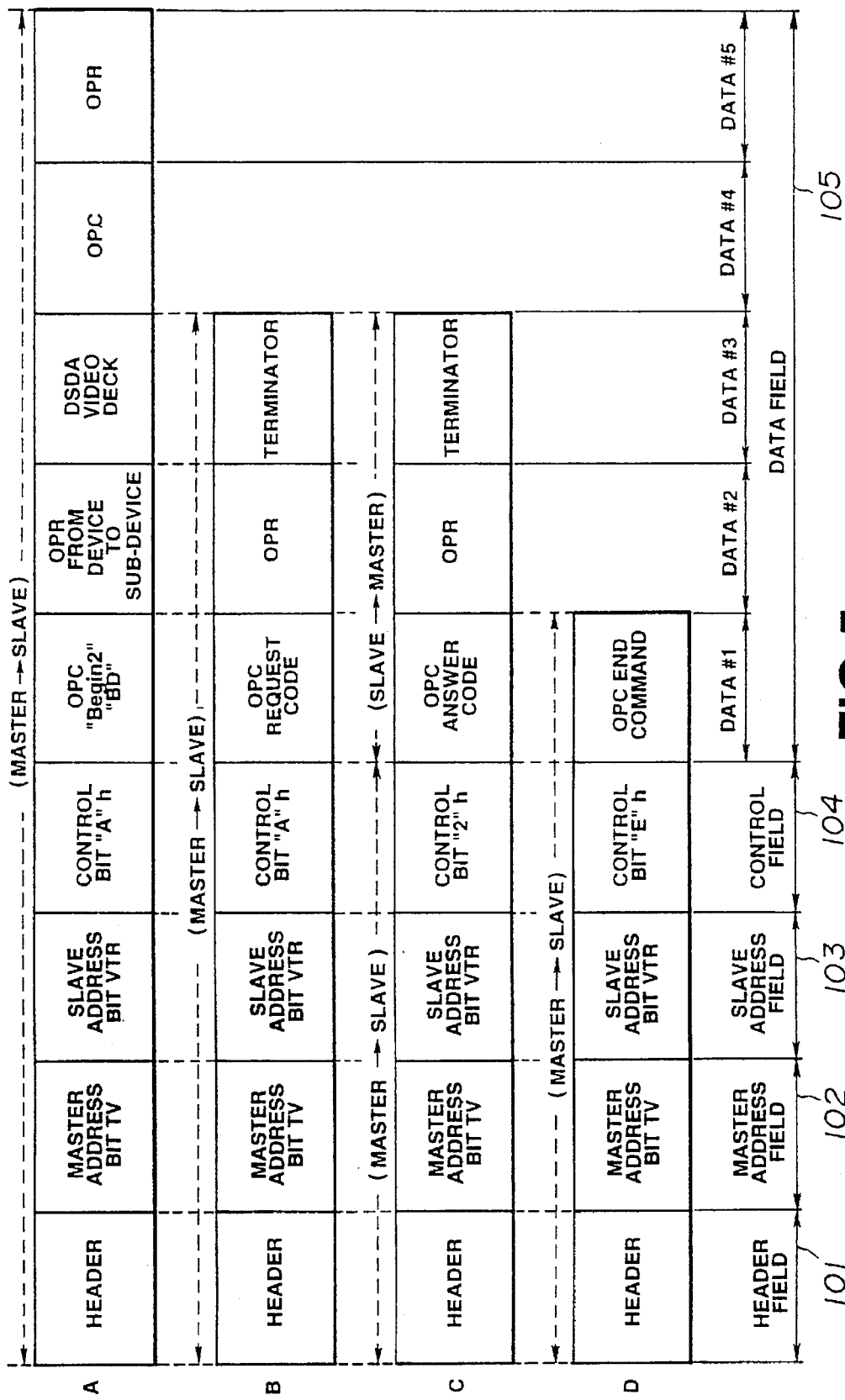
FIG. 5 shows the formats of the conventional command, request and answer frames.

The header operand (HDOPR) is designated at a pre-set position, that is at data #2, and its three bits $b_6$, $b_5$, $b_4$, with $b_7$ being the MSB, indicate one of the control command, request, answer or automatic status transmitting frames, that is whether the frame in subject is the frame for command, the frame for request the frame for answer or the frame for automatic transmission. Specifically, $b_6=0$, $b_5=0$, $b_4=0$, referred to hereinafter as $b_6$, $b_5$, $b_4=0$, 0, 0, indicates the frame for command, $b_6$, $b_5$, $b_4=0$, 0 1 indicates the frome for request, $b_6$, $b_5$, $b_4=0$, 1, 0 indicates the frame for answer and $b_6$, $b_5$, $b_4=1$, 1, 0 indicates the frame for automatic transmission, as shown for example in FIG. 5.

The bits $b_3$, $b_2$ are used as a service code and, as shown in FIG. 10, $b_1=0$, $b_0=0$ indicate the communication telephony system, $b_1=0$, $b_0=1$ indicate the AV system (audio video and control system), $b_1=1$, $b_0=0$ indicate the housekeeping equipment system (HK system) and $b_1=1$, $b_0=1$ indicate the additional AV system.

The lower two bits, that is bits $b_1$, $b_0$ indicate communication from a sub-device enclosed in a device to another device, referred to herein as communication from a sub-device to a device, communication from a device to a sub-device enclosed in another device, referred to herein as communication from a device to a sub-device, or communication from a device to another device. Specifically, $b_1=0$, $b_0=1$ indicates communication from a sub-device to a device, $b_1=1$, $b_0=0$ indicates communication from a device to a sub-device, and $b_1=1$, $b_0=1$ indicates communication from a device to a device, as shown in FIG. 10. That is, with the present bi-directional bus system, communication from a sub-device enclosed in a device to a sub-device enclosed in another device is not performed in this bi-directional bus system. In other words, the HDOPR in which $b_1=0$ and $b_0=0$ is not employed.

Thus, when performing a command, for example, when transmitting a control command of playing the video deck 20a to the video deck 20a (sub-device) enclosed in the VTR 20 (another device) from the TV 10 (device), the microprocessor 12 of the TV 10 designates the address of the TV 10 in the master address field 52 as a master address bit, while designating the address of the VTR 20 in the slave address field 53 as the slave address bit and designating a code "E"h indicating the command writing from a master to a slave as a control bit, as shown for example in FIG. 6A. In addition, the micro-processor 12 designates the code "AB"h in the data #1 as a text header, while designating the code "06"h indicating that the communication is from a device to a sub-device and indicating that the frame is subject is a frame or command as HDOPR in the data #2, and also designating the address of the video deck 20a in the data #3 as DSDA. Finally, the micro-processor 12 designates the code "C3"h of playing the video deck, for example, in the next following data #4 as OPC, while designating the code "75"h indicating "forward" in the data #4 as OPR.

When the command of transmitting the control command of turning the power source off from the TV 10 (device) to the VTR (device), the micro-processor 12 designates the code indicating that the communication is a command communication from a device to another device in the data #2 as HDOPR, while designating a dummy code, such as "7F"h in the data #3, because the address of the sub-device is not required. This micro-processor 12 also designates a code "A0"h indicating the stand-by in the data #4 as OPC, while designating the code "70"h indicating the "on" state in the data #4 as OPR.

On the other hand, in request communication, that is when requesting the status of the video deck 20a (sub-device)

from the TV 10 to the VTR 20, the micro-processor 12 of the TV 10 designates the address of the TV 10 in the master address field 52 as a master address bit, while designating the address of the VTR 20 in the slave address field 53 as a slave address bit and designating a code "E"h indicating writing under the locked state of the command from the master to the slave in the control field 54 as a control bit, as shown for example in FIG. 11B.

The micro-processor 12 also designates a code "AB"h in the data #1 as a text header, while designaGing a code "16"h indicating that the communication is from the device to another device and also indicating that the frame in subject is a frame for status request in the data #2 as HDOPR, and also designating the address of the video deck 20a in the data #3 as the DSDA. The micro-processor 12 also designates the request code, for example, a code "C#2h of playing the video deck, for example, in the data #4 as OPC, while designating the OPR for this request code in the data #4. When requesting data for displaying letters or the like in, for example, the TV monitor 10b, the micro-processor 12 designates a code "26"h, indicating that the frame is a data request frame and that the communication is from a device to a sub-device, in the data #2 as HDOPR.

The transmission signal having the above-mentioned frame construction is fed from the micro-processor 12 of the TV 10 to the bus interfacing circuit 14. This bus interfacing circuit then detects the presence or absence of a carrier on the bidirectional bus 1 and, if there is no carrier, that is if the bus 1 is not occupied, the interfacing circuit transmits the transmission signal to, for example, the VTRs 20, 30 and the VDP 40 over the bidirectional bus 1. After sending the command frame etc., the bus interfacing circuit 14 immediately halts the transmission of the carrier to open the bidirectional bus 1.

In the command transmission from the TV 10 to the VTR 20, the bus interfacing circuit 24 of the VTR 20 receives the transmission signal over the bidirectional bus 1 and transmits the received transmission signal to a micro-processor 22. The micro-processor 22 executes the program stored in the ROM 22a and detects the route selection code inserted at the pre-set position in the data field 55 from the transmission signal. The micro-processor 22 then detects, based on the route selection code, whether the frame in subject is the command frame, status request frame, data request frame, answer or response frame or the frame for automatic status transmission.

The micro-processor 22 detects, based upon the route selection code, whether the communication is from a sub-device enclosed in a device to another device, from a device to a sub-device enclosed in another device, or from a device to another device.

Specifically, the micro-processor 22 detects, based upon the master address bit of the master address field 52 of the transmission signal and the slave address bit of the slave address field 53, that the transmission signal is the signal transmitted to it from the TV 10, while detecting, based on the code of the control field 54, such as by the code "E"h, that the transmission signal is the command writing from a master to a slave. In such a case, the micro-processors of the VTR 30 and the VDP 40 detect that, since the slave address is not its address, the communication is not directed to it, and thus does not perform an operation associated with the transmission signal.

The micro-processor 22 also detects, based upon the text header designated in the data #1 of the data field 55, for example, by the code "AB"h, that the code is not OPC "begin 2" (code "BD"h), OPC "begin 2" ("BC"h) nor OPC "begin 2" ("BB"h). Besides, based upon the HDPOR designated in the data #2, the micro-processor 22 detects that the frame in subject is the command frame if the bit $b_6$, $b_5$, $b_4$ are 0, 0, 0 ($b_6$, $b_5$, $b_4$=0, 0, 1), the frame in subject is the status request frame if the bit $b_6$, $b_5$, $b_4$ are 0, 0, 1, the frame in subject is the data request frame if the bit $b_6$, $b_5$, $b_4$ are 0, 1, 0, the frame in subject is the answer or response frame if the bit $b_6$, $b_5$, $b_4$ are 0, 1, 1 and that the frame is the automatic status transmission frame if $b_6$, $b_5$, $b_4$ are 1, 0, 0.

That is, with the present bi-directional bus system, the transmitting device inserts the HDOPR for discrimination of the command frame from the request frame in the data #2 of the data field 55 and transmits these frames. The destination device or receiving device discriminates the command frame from the request frame, based upon the HDOPR, for simplifying the processing software and the hardware of the destination device, such as the VTR 20, as compared to those of the conventional system. Besides, since the HDOPR is not inserted at the trailing end of the frame, the possibility of HDOPR dropout may be lowered in order to prevent the request frame from being mistakenly judged to be the command frame.

The micro-processor 22 also detects that the communication is from a device to another device, from a sub-device to a device and from a device to a device if the lower two bits are 1, 0 ($b_1$=1, $b_0$=0), 0, 1 and 1, 1, respectively. That is, discrimination can be made if the transmission signals pursuant to the conventional D2B are transmitted over the same bidirectional bus 1.

On the other hand, if the communication is from a device to a sub-device or from a sub-device to a device, the micro-processor 22 recognizes that the DSDA and SSDA are designated in the data #3, respectively. The micro-processor 22 recognizes that, if the communication is from a device to a device, the micro-processor 22 recognizes that the data #3 is the dummy code "7F"h. Based upon the DSDA specified in, for example, the data #3, the micro-processor 22 determines that the control is for e.g. the video deck 20a.

The equipment (devices), such as the VTR 20, include command tables for converting the control command into the internal control command for controlling the sub-device, for respective sub-devices provided or enclosed in the devices. Based upon these command tables, the same control commands are converted or decoded into the internal control commands having different control contents from one type of the controlled sub-device to another. Specifically, a deck/player command table for the video deck 20a and the tuner command table for the tuner 20b are stored in the ROM 22a of the micro-processor 22. Based upon these command tables, the micro-processor 22 converts or decodes the commands specified in data #4 and #5 of the data field 55 into the internal control command for controlling the video deck 20 a and the switch box 20c and, based upon the internal control command, controls the video deck 20a and the switch box 20c via the internal control bus 21. For example, the OPC of the control command being the code "C0"h indicates the repeat, band control, contrast control and volume control for a deck/player command, a tuner command, a video command and an audio command, respectively. In other words, a command table determined by the default value of the sub-device designated by the DSDA is employed, and the code of the control command may be employed in common depending upon the sub-device type, thereby making it possible to shorten the control command length.

If, for example, the DSDA is the video deck 20a, the OPC of the control command is the code "C3"h and the OPR is the code "75"h, the micro-processor 22 decodes the control command into the internal control command which stands for "play" and "forward", based upon the deck/player command table, and controls the video deck 20a for executing the reproducing operation over the internal control bus 21. Besides, the micro-processor 22 causes the AV signals from the video deck 20a to be supplied via the switch box 20c to the switch box 10d of the TV 10. Thus the communication from the TV 10 (device) to the video deck 20a of the VTR 20 (sub-device) is performed, so that the picture corresponding to the AV signals reproduced by the VTR 20 can be viewed on the TV 10.

On reception of the command frame, as described above, the micro-processor 22 transmits the answer (response) frame to the TV 10, as the response to the command, within a pre-set time as from reception of the command frame.

Figure 11:
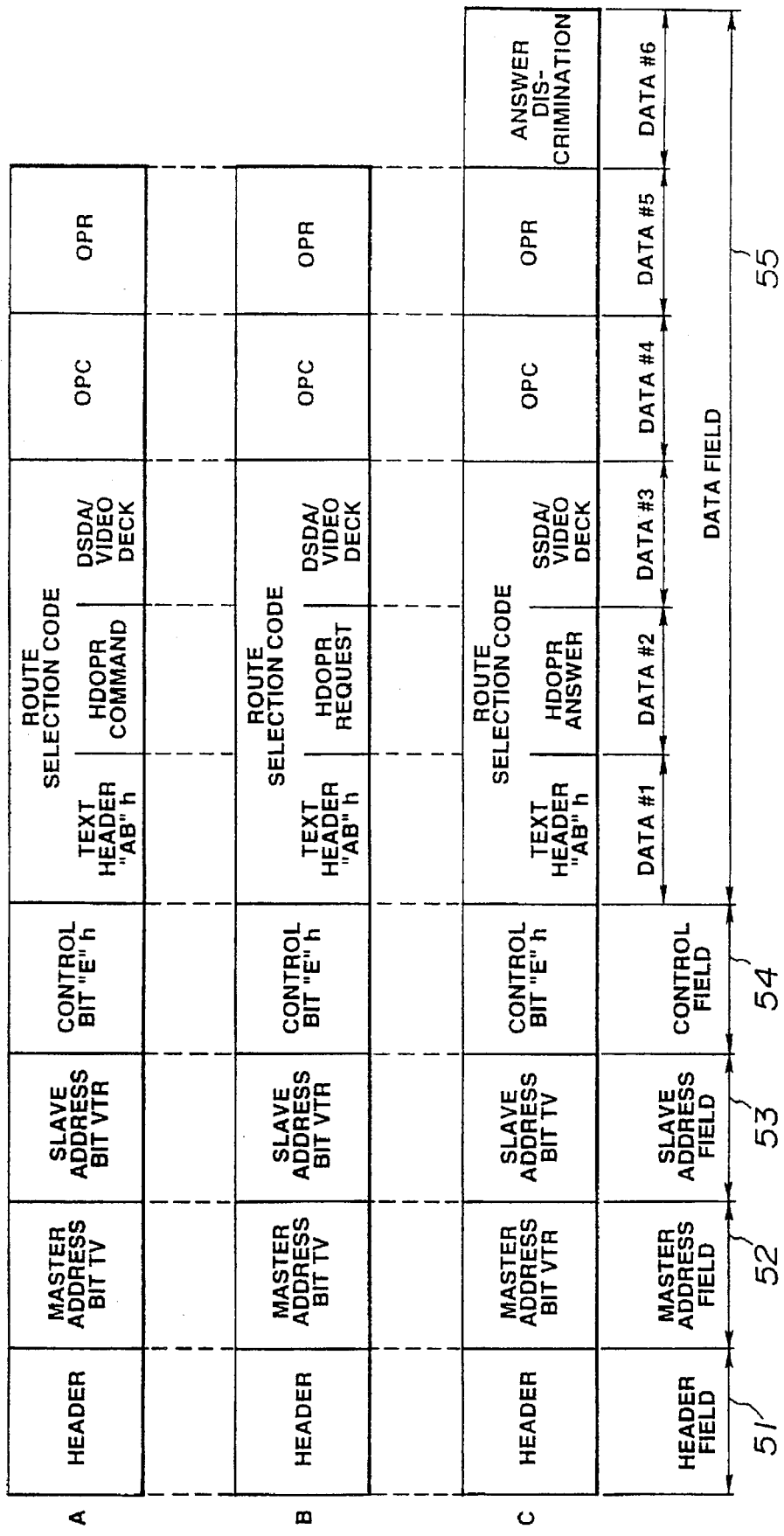
FIG. 11 shows a practical format of command, request and answer frames.

Specifically, the micro-processor 22 designates the address of the VTR 20 in the master address field 52 as a master address bit, while designating the address of the TV 10 in the slave address field 53 as the slave address bit, and designating a code "E"h indicating the command writing from the master to the slave in the control field 54 as a control bit, as shown for example in FIG. 11. Besides, the micro-processor 12 designates a code "AB"h in the data #1 as the text header, while designating a code "35"h, indicating that the frame is the answer frame and that the communication is from a sub-device to a device in the data #2, as HDOPR, while designating the address of the video deck 20a as the SSDA. The micro-processor 12 also designates the code "C3"h indicating the play in the next following data #4 as the OPC, while designating a code "75"h indicating "forward" in the data #5 as the OPR and designating an answer terminator in the data #6. The micro-processor 22 transmits the answer frame to the bus interfacing circuit 24, which then transmits (returns) the transmission signal of the frame to the TV 10 over the bidirectional bus 1. After transmitting the answer frame, the frame interfacing circuit 24 immediately halts carrier transmission to open the bidirectional bus 1. The terminator of the answer frame is made up of, for example, 8 bits. The code "10"h indicates the absence of the ability of executing the command (not implemented), code "11"h indicates the presence of the ability of executing the command but the absence of such ability at present (reject), code "12"h indicates the inability to give judgement on executability at the time point of reception (busy), and the code "13"h indicates the completion of the execution of the command (completed).

That is, with the conventional bidirectional bus system, a request frame has to be sent in order to confirm the operating state of the VTR after sending the command frame for sending the control command to the VTR. On the other hand, since the route selection information is present only in the command frame, it is necessary to send the answer frame. In addition, for unlocking the VTR, it is necessary to send the end command frame. With the bidirectional bus system of the present invention, since the VTR 20 on reception of the command frame sends the answer frame having the route selection code to the TV 10 to return the status, the request frame as well as the end command frame may be deleted. In other words, by inserting the HDOPR discriminating the command frame, request frame, answer frame and the automatic status transmission frame in the data #2 of the data field, it is possible for the TV 10 and the VTR 20 to send these frames by option, that is without regard to other frames. With the present system, the amount of the traffic on the bidirectional bus 1 may be diminished to improve the transmission efficiency. Besides, the communication protocol may be simplified. With the conventional bidirectional bus system, the bidirectional bus 1 is occupied for a longer time compared to the rate of communication until return of an answer to a request. With the present bidirectional bus system, since the frames may be sent out by option, the bidirectional bus 1 may be prevented from being occupied for lengthy time intervals, with the result that the amount of traffic may be diminished.

On the other hand, if the VTR 20 receives the status request frame from the VTR 10, it returns an answer frame, shown in FIG. 11C, to the TV 10 for answering the status request.

Even in the absence of request, the VTR 20 automatically sends out an automatic status transmission frame, in which the HDOPR is set to a code "43"h, to the TV 10.

It is to be noted that the present invention is not limited to the above-described embodiments, and may be applied to a bidirectional bus system for controlling AV equipment other than D2B or HBS.

What is claimed is:

1. A method of forming a transmission signal to be transmitted by a bidirectional bus system in which a plurality of devices performing the communication of a command and a request are interconnected over a bidirectional bus, comprising the steps of:

providing a frame of a transmission signal on the bidirectional bus including an address field for designating addresses of communicating devices and a data field for designating the command or the request to be transmitted;

inserting discrimination information for discriminating between the command and the request at a pre-set position in the data field;

transmitting the transmission signal having the discrimination information inserted therein over the bidirectional bus to other devices; and inserting information indicating a device communication configuration at a pre-set position in the data field, the device communication configuration being one of communication from a sub-device within a first device to a device other than the first device, communication from a second device to a sub-device within a device other than the second device, and communication from a third device to a device other than the third device, excluding communication from a sub-device within a device to a sub-device within another device.

2. The method as claimed in claim 1, further comprising the step of designating the command, the request, an answer to the request, or the status of a device in the data field.

3. The method as claimed in claim 2, wherein the discrimination information is information for discriminating between the command, the request, the answer, and an automatic status transmission.

4. A method of reception by a bidirectional bus system in which a plurality of devices performing the communication of a command and a request are interconnected over a bidirectional bus, comprising the steps of:

receiving a transmission signal over the bidirectional bus, the transmission signal having a frame structure including an address field for designating addresses of communicating devices and a data field for designating the command or the request to be transmitted, the transmission signal having discrimination information and configuration information inserted at pre-set respective positions in the data field, the discrimination information discriminating between the command and the request and the configuration information indicating one of communication from a sub-device within a first device to a device other than the first device, communication from a second device to a sub-device within a device other than the second device, and communication from a third device to a device other than the third device, excluding communication from a sub-device within a device to a sub-device within another device;

detecting the discrimination information from the transmission signal; and recognizing whether the contents of the data field is the command or the request based on the discrimination information and the configuration of the communication based on the configuration information.

5. The method of reception as claimed in claim 4, wherein the command, the request, an answer to the request, or the status of a device is designated in the data field.

6. The method of reception as claimed in claim 5, wherein the discrimination information is information for discriminating between the command, the request, the answer, and an automatic status transmission.

7. The method of reception as claimed in claim 4, further comprising the step of converting the recognized command into an internal command for controlling the sub-device when the recognized configuration of the communication is designated to the sub-device within the device.

8. A communication system employing a bidirectional bus system in which a plurality of devices performing the communication of a command and a request are interconnected over a bidirectional bus, the communication system comprising:

a source device for providing a frame of a transmission signal on the bidirectional bus, the frame including an address field for designating addresses of communication devices and a data field for designating the command or the request to be transmitted, for inserting discrimination information at a pre-set position of the data field for discriminating between the command and the request for inserting at a pre-set position of the data field configuration information indicating one of communication from a sub-device within a first device to a device other than the first device, communication from a second device to a sub-device within a device other than the second device, and communication from a third device to a device other than the third device, excluding communication from a sub-device within a device to a sub-device within another device and for sending the transmission signal with the discrimination information and the configuration information inserted therein over the bidirectional bus; and a destination device for receiving the transmission signal over the bidirectional bus, for detecting the discrimination information and the configuration information from the transmission signal and for recognizing whether the contents of the data field is the command or the request based upon the discrimination information and the configuration of the communication based on the configuration information.

9. The communication system as claimed in claim 8, wherein the source device designates the command, the request, an answer to the request or the status of a device in the data field and sends the transmission signal having the discrimination information inserted therein over the bidirectional bus, the discrimination information being information discriminating between the command, the request, the answer to the request, or the status of the device, and wherein the destination device discriminates whether the contents of the data field are the command, the request, the answer to the request or the status of the device based upon the discrimination information.

10. The communication system as claimed in claim 8, wherein the destination device converts the recognized command into an internal command for controlling the sub-device when the recognized configuration of the communication is designated to the sub-device within the device.

* * * * *